(12) United States Patent
Kratzer et al.

(10) Patent No.: US 11,679,619 B2
(45) Date of Patent: Jun. 20, 2023

(54) TRANSFER FILM, METHOD FOR PRODUCING A FILM-COATED ARTICLE AND FILM-COATED ARTICLE

(71) Applicant: LEONHARD KURZ Stiftung & Co. KG, Fürth (DE)

(72) Inventors: Andreas Kratzer, Bamberg (DE); Klaus Deckert, Postbauer-Heng (DE); Martin Hahn, Herrieden (DE)

(73) Assignee: LEONHARD KURZ Stiftung & Co. KG, Fürth (DE)

( * ) Notice: Subject to any disclaimer, the term of this patent is extended or adjusted under 35 U.S.C. 154(b) by 359 days.

(21) Appl. No.: 16/638,696

(22) PCT Filed: Jul. 19, 2018

(86) PCT No.: PCT/EP2018/069600
§ 371 (c)(1),
(2) Date: Feb. 12, 2020

(87) PCT Pub. No.: WO2019/034361
PCT Pub. Date: Feb. 21, 2019

(65) Prior Publication Data
US 2020/0361233 A1   Nov. 19, 2020

(30) Foreign Application Priority Data

Aug. 18, 2017  (DE) .................... 10 2017 118 904.1

(51) Int. Cl.
| | | |
|---|---|---|
| B44C 1/17 | (2006.01) | |
| B29C 37/00 | (2006.01) | |
| B29K 75/00 | (2006.01) | |
| B29L 31/00 | (2006.01) | |
| B44C 5/04 | (2006.01) | |

(52) U.S. Cl.
CPC ........ B44C 1/1729 (2013.01); B29C 37/0032 (2013.01); B29K 2075/00 (2013.01); B29K 2995/002 (2013.01); B29K 2995/0026 (2013.01); B29L 2031/722 (2013.01); B44C 5/0453 (2013.01)

(58) Field of Classification Search
None
See application file for complete search history.

(56) References Cited

U.S. PATENT DOCUMENTS

| | | |
|---|---|---|
| 7,906,054 B2 | 3/2011 | Hirschfelder et al. |
| 2005/0255314 A1 | 11/2005 | Wang et al. |

(Continued)

FOREIGN PATENT DOCUMENTS

| | | |
|---|---|---|
| CA | 2268288 A1 | 2/1999 |
| CN | 101077672 A | 11/2007 |

(Continued)

OTHER PUBLICATIONS

ASTM E1899-16 ("Standard Test Method for Hydroxyl Groups Using Reaction with p-Toluenesulfonyl Isocyanate (TSI) and Potentiometric Titration with Tetrabutylammonium Hydroxide", 2016, ASTM International, West Conshohocken, PA, USA).

(Continued)

*Primary Examiner* — Barbara J Musser
(74) *Attorney, Agent, or Firm* — Hoffmann & Baron, LLP (57) ABSTRACT

A transfer film, a method for producing a film-coated article and a film-coated article.

7 Claims, 2 Drawing Sheets

(56) References Cited

U.S. PATENT DOCUMENTS

| | | |
|---|---|---|
| 2005/0260386 A1 | 11/2005 | Heinrich et al. |
| 2007/0275248 A1 | 11/2007 | Peng et al. |
| 2008/0277050 A1 | 11/2008 | Liu et al. |
| 2014/0113115 A1 | 4/2014 | Ito et al. |
| 2017/0021388 A1 | 1/2017 | Sangkaratana et al. |
| 2017/0210084 A1 | 7/2017 | Kaneuchi et al. |

FOREIGN PATENT DOCUMENTS

| | | | |
|---|---|---|---|
| CN | 101092050 A | 12/2007 | |
| DE | 10221482 C1 | 9/2003 | |
| DE | 10236810 A1 | 2/2004 | |
| DE | 102009022542 A1 | 12/2010 | |
| DE | 102012220903 A1 | 5/2014 | |
| EP | 1149711 A1 | 10/2001 | |
| JP | H08183297 A | 7/1996 | |
| WO | 2006021199 A1 | 3/2006 | |
| WO | WO-2008051629 A2 * | 5/2008 | ......... B29C 37/0025 |
| WO | WO2012176742 A1 | 12/2012 | |
| WO | 2014076074 A1 | 5/2014 | |
| WO | 2017062822 A1 | 4/2017 | |

OTHER PUBLICATIONS

ASTM D4273-11 ("Standard Test Method for Polyurethane Raw Materials: Determination of Primary Hydroxyl Content of Polyether Polyols", 2011, ASTM International, West Conshohocken, PA, USA).

DIN 53240-3:2016-03 ("Bindemittel für Beschichtungsstoffe—Bestimmung der Hydroxylzahl—Teil 3: Schnellverfahren", issue date: Mar. 2016 ["Binders for paints and varnishes—Determination of Hydroxyl Value—Part 3: Rapid Test"]).

ISO 14900:2017-03 ("Plastics—Polyols for use in the production of polyurethane—Determination of hydroxyl number", issue date: Mar. 2017).

ASTM D4274-16 ("Standard Test Methods for Testing Polyurethane Raw Materials: Determination of Hydroxyl Numbers of Polyols", 2016, ASTM International, West Conshohocken, PA, USA).

DIN EN ISO 14896:2009-07 ("Kunststoffe—Polyurethanrohstoffe—Bestimmung des Isocyanatanteils", issue date Jul. 2009 ["Plastics—Polyurethane raw materials—Determination of isocyanate content"]).

ASTM D2572-97(2010) ("Standard Test Method for Isocyanate Groups in Urethane Materials or Prepolymers", 2010, ASTM International, West Conshohocken, PA, USA).

ASTM D2074-07(2013) ("Standard Test Methods for Total, Primary, Secondary, and Tertiary Amine Values of Fatty Amines by Alternative Indicator Method", 2013, ASTM International, West Conshohocken, PA, USA).

DIN EN ISO 3219:1994-10 ("Kunststoffe—Polymere/Harze in flüssigem, emulgiertem oder dispergiertem Zustand—Bestimmung der Viskosität mit einem Rotationsviskosimeter bei definiertem Geschwindigkeitsgefälle" issue date Oct. 1994.

DIN EN ISO 4624: 2016-08 ("Beschichtungsstoffe—Abreißversuch zur Bestimmung der Haftfestigkeit", Ausgabedatum: Aug. 2016).

DIN EN ISO 16276-1: 2007-08 ("Korrosionsschutz von Stahlbauten durch Beschichtungssysteme—Beurteilung der Adhäsion/Kohäsion (Haftfestigkeit) einer Beschichtung und Kriterien für deren Annahme—Teil 1: Abreißversuch", issue date: Aug. 2007).

* cited by examiner

TRANSFER FILM, METHOD FOR PRODUCING A FILM-COATED ARTICLE AND FILM-COATED ARTICLE

This application claims priority based on an International Application filed under the Patent Cooperation Treaty, PCT/EP2018/069600, filed Jul. 19, 2018, which claims priority to DE 102017118904.1, filed Aug. 18, 2017.

BACKGROUND OF THE INVENTION

The present invention relates to a transfer film, a method for producing a film-coated article and a film-coated article.

Film-coated articles, for example injection-molded articles, methods for the production thereof, as well as in-mold-capable transfer films or IMD films (IMD=in-mold decoration) are known in the state of the art.

Thus DE 102 21 482 C1 discloses a device for producing a molded part made of a curing injection-molding material which is decorated by in-mold injection molding with a stamping film having a carrier film and a decorative ply which can be detached from the carrier ply. The stamping film is inserted into an open injection mold, wherein the decorative ply of the stamping film faces a mold upper part. The injection mold is closed and liquid injection-molding material is injected through an injection channel into the cavity of the injection mold, wherein the stamping film clings to the visible face of the injected molded part. The stamping film is joined with its decorative ply to the injection-molding material, which is removed from the injection mold after the curing. Once the carrier film has been peeled off the decorative ply, the decorated molded part is finished. Injection-molded articles decorated in this way are used, in particular, in automobile interior parts such as door trims, trims in instrument panels, gear shift covers and center console covers, in automobile exterior parts such as door impact protection strips and covers on A-, B- and C-pillars, in decorative trims on housings of radio and television sets in the audio and video field, as well as in shells of mobile devices such as mobile phones or navigation devices in the telecommunications field.

Insert molding (IM) is a method combining hot stamping, vacuum forming and casting, in particular injection molding. Compared with the IMD method, insert molding offers the possibility of deforming the film to a greater extent. This is advantageous if e.g. strongly profiled and shaped parts are required. First, a vacuum-formable, thin hot-stamping film is hot-stamped on a carrier, e.g. an ABS film (thickness approximately between 200 µm and 750 µm) (ABS=acrylonitrile butadiene styrene). This hot-stamped carrier is vacuum-formed under heat. The plies of hot-stamping film and carrier vacuum-formed in this way form the so-called "insert" and are cut or punched out with precise contours. The "insert" is positioned in an injection mold, the mold is filled with plastic (the "insert" is back injection molded), then the decorated injection-molded article is removed from the injection mold.

DE 102 36 810 A1 discloses partially structured multilayer films which are suitable for use in injection molds. Such an IMD-capable multilayer film or a multilayer film for the in-mold decoration of injection-molded parts has a carrier film with a decorative element for transfer onto the injection-molded part. The carrier film is removed after the decorative element has been applied to the injection-molded body. The decorative element has a detachment layer, a protective varnish layer, a structure layer with a three-dimensional structure, an intermediate layer, a reflective layer and an adhesive layer.

Conventional IM films for automobile interiors have highly thermoplastic protective varnish systems due to the required strong strain capacities of up to 300%. However, these protective varnish systems display a strong susceptibility to the action of sweat and chemicals, for example sun- or skin-protection cream and insect repellent constituents, because of the low degree of crosslinking of their polymer component(s) necessary for this purpose. This manifests itself in a wide variety of damage patterns on the affected varnish layers, from swelling to marked crack formation through to complete dissolution of the varnish.

WO 2006/021199 A1 relates to a decorated injection-molded article which is formed of at least one injected plastic material and at least one decorative element securely mechanically joined thereto, which is formed by a transfer ply of a transfer film and provides a decoration for the injection-molded article, wherein both sides of the decorative element are at least partially covered with at least one injection-molded plastic material.

The application of injection-molded plastic material to both sides of the first decorative element, however, has the disadvantage that the varnish layers of the transfer film are highly stressed and can be damaged, in particular washed off, due to the high temperatures and pressures occurring during the injection molding.

Also known are protective layers for hot-stamping films, IMD films, insert-molding films. The aim of these protective layers is always a very high resistance to mechanical, any physical and chemical attacks. In particular, the adhesion of all possible foreign substances to the protective layer is to be as low as possible, with the result that for example a further applied protective layer does not display sufficient adhesion.

Furthermore, the flooding of items, for example injection-molded articles, with polyurethane (PU) is known from the state of the art. For this, for example an item to be coated is positioned in a mold which has two mold halves. A first mold half receives the item to be coated, and a second mold half forms a cavity that is slightly larger than the item to be coated. PU is introduced into this interspace and the item to be coated is flooded with PU. Two-component PU systems (2C PU) which cure within seconds after the components have been mixed before and/or directly during the flooding are likewise known. If the mold opens, the PU is already sufficiently hard.

However, the protective layers known from the state of the art, which have been produced by flooding, do not have sufficient adhesion to the coated item.

SUMMARY OF THE INVENTION

The object of the present invention is therefore to provide a transfer film with a carrier ply and a transfer ply, from which it is possible to peel the carrier ply off the transfer ply without damaging the transfer ply. At the same time, after the application to a substrate or the processing of the transfer film and removal of the carrier ply, the adhesiveness of the transfer ply to a protective layer applied subsequently is to be so great that it is not possible to peel the protective layer off the transfer ply and/or the coated substrate without damaging the transfer ply.

The object of the present invention is achieved by providing a transfer film according to claim 1, comprising a carrier ply and a transfer ply, which contains at least one decorative element, arranged on the carrier ply, wherein the transfer ply, adjoining the carrier ply, has at least one upper layer, which is not yet completely cured at least in areas, wherein the at least one decorative element is arranged on the side of the at least one upper layer facing away from the carrier ply, and wherein the carrier ply is at least one carrier layer made of a polyester, a polyolefin or a combination thereof, in particular made of PET.

The upper layer preferably has at least one binder which is selected from the group which consists of polyurethane resins, polyurethane dispersions, acrylic resins, methacrylic resins, phenolic resins, epoxy resins, polyureas, melamine resins, aminoplasts, polyester resins, alkyd resins, polyamide resins, vinyl ester resins and mixtures thereof, preferably polyurethane resins, polyurethane dispersions, phenolic resins, epoxy resins, polyureas, melamine resins, aminoplasts, polyester resins, alkyd resins, polyamide resins and mixtures thereof.

A transfer film according to claim 1 is further preferably used in a method according to the invention according to one of claims 12 to 17.

Preferred embodiments of the transfer film according to the invention are specified in dependent claims 2 to 11.

The object of the present invention is furthermore achieved by providing a method according to claim 12 for producing a film-coated article, preferably using a transfer film according to one of claims 1 to 11, wherein the transfer film comprises a carrier ply and a transfer ply, which contains at least one decorative element, arranged on the carrier ply, wherein the method comprises the following steps:

a) joining a substrate to at least one surface of the transfer ply facing away from the carrier ply,
b) removing the carrier ply from the transfer ply bonded to the substrate, and
c) applying at least one protective layer to a surface of the transfer ply lying opposite the substrate,
wherein the transfer ply, adjoining the carrier ply, has at least one upper layer, which is not yet completely cured at least in areas, wherein the at least one decorative element is arranged on the side of the at least one upper layer facing away from the carrier ply, and wherein the application of the at least one protective layer to the at least one upper layer of the transfer ply in step c) is effected by at least partial flooding and/or dousing of the at least one upper layer with at least one solvent-containing, preferably flowable, polyurethane-containing composition and subsequent curing.

Preferred embodiments of the method according to the invention are specified in dependent claims 13 to 17.

The object of the present invention is furthermore achieved by providing a film-coated article according to claim 18, preferably produced by a method according to one of claims 12 to 17 further preferably using a transfer film according to one of claims 1 to 11, comprising a substrate and at least one transfer ply, which contains at least one decorative element, at least partially arranged on at least one surface of the substrate, wherein the side of the transfer ply facing away from the substrate is formed by at least one, preferably cured, upper layer, on which at least one protective layer, which comprises at least one plastic based on a polyurethane, with a thickness from a range of from 0.2 mm to 5 mm is arranged, wherein the at least one protective layer adheres to the at least one upper layer with an adhesiveness, determined according to the method described in DIN EN ISO 4624: 2016-08, preferably with a PosiTest® AT Series pull-off adhesion tester from DeFelsko Corporation (Ogdensburg, N.Y., USA) using a 20 mm dolly, from a range of from 2.5 MPa to 5 MPa, in particular from 2.5 MPa to 10 MPa.

Preferred embodiments of the article according to the invention are specified in dependent claim 19.

A transfer film according to the invention comprising a carrier ply and a transfer ply, which contains at least one decorative element, arranged on the carrier ply, wherein the transfer ply is preferably arranged detachably on the carrier ply.

A transfer film according to the invention is preferably used to transfer a transfer ply onto an object, wherein at least one surface of the object is at least partially joined to at least one surface of the transfer ply facing away from the carrier ply, obtaining a coated object.

After arranging the transfer ply on at least partial areas of the at least one surface of the object, the carrier ply is preferably removed from the transfer ply, preferably completely, with the result that only the transfer ply is arranged on at least partial areas of the surface of the coated object, preferably at least partially forms the surface of the coated object.

In the process the detachment of the carrier ply from the transfer ply is preferably effected at a layer boundary between the carrier ply and the transfer ply.

At least one decorative element is transferred onto the object together with the transfer ply, wherein the at least one decorative element is arranged on at least partial areas of the surface of the coated object after the transfer of the transfer ply and the removal of the transfer ply and, depending on the design of the at least one decorative element, can influence the physical properties, preferably the haptic, optical, electrical and/or mechanical properties, and/or the chemical properties of the surface of the coated object.

For example, the at least one decorative element can influence the surface texture and/or color of the coated object, for example by providing embossings, roughening, patterns or a smoothness and/or by providing reflection-determining properties such as transparency, gloss or matting and/or by providing a color.

For example, the at least one decorative element can influence the mechanical properties of the coated object, for example by providing a surface hardness, surface elasticity and/or breaking strength of the surface.

For example, the at least one decorative element can influence the chemical properties of the coated object, for example by providing a resistance of the surface to the action of acids and/or bases.

The at least one decorative element can preferably be formed as a motif, as a decoration, for example individual image decoration or endless decoration, as a pattern, or a combination thereof.

For example, the at least one decorative element can be formed as an optically active surface structure or one generating optical effects, wherein a suitable surface structure is preferably selected from the group which consists of diffractive surface structure, in particular hologram, zero-order diffraction structure, matte structure, in particular isotropic or anisotropic matte structure, blazed grating, lens structure, microlens structure, microprism structure, micromirror structure, or a combination of two or more of these surface structures.

For example, the at least one decorative element can be formed as an optically active and/or optically variable substance, which are preferably present as a dye, liquid crystal material, pigment, or a mixture thereof. Suitable pigments are, for example, interference layer pigments, liquid crystal pigments, diffractive pigments, metallic pigments, thermochromic pigments, photochromic pigments or mixtures thereof. The substance can display in each case different or also similar optical effects in particular in different wavelength ranges, for example in the infrared range, in the ultraviolet range and visible range. The substance can display in each case different or also similar optical effects in particular also at or in different illumination and/or observation angles or directions.

Preferably, the at least one decorative element is arranged in at least one decorative layer, which further preferably comprises, in each case independently of one another, a UV-crosslinked varnish and/or a thermoplastically deformable layer and which is, in each case independently of one another, unpigmented or pigmented or dyed.

Preferably, the at least one decorative layer is selected from the group which consists of at least partially arranged metal layers, at least partially arranged layers with relief structures, at least partially arranged color layers, at least partially arranged interference layers or combinations thereof.

Further preferably, the at least one decorative layer is selected from the group which consists of transparent and/or colored varnish layers, in particular comprising one or more dyes and/or pigments, replication layers with a molded optically active surface structure, reflective layers, in particular opaque reflective layers, transparent reflective layers, metallic reflective layers or dielectric reflective layers, optically variable layers, optically active layers, interference multilayer systems, volume hologram layers, liquid crystal layers, in particular cholesteric liquid crystal layers, electrically conductive layers, antenna layers, electrode layers, magnetic layers, magnetic storage layers, barrier layers and combinations thereof.

Further preferably, the at least one decorative layer has a layer thickness which is, in each case independently of one another, in a range of from 0.1 μm to 15 μm, further preferably in a range of from 4 to 8 μm.

The transfer ply of a transfer film according to the invention, adjoining the carrier ply, has at least one upper layer, which is not yet completely cured at least in areas, wherein the at least one decorative element, preferably in at least one of the above-named decorative layers, is arranged on the side of the at least one upper layer of the transfer ply facing away from the carrier ply.

A layer is referred to as "not yet completely cured" within the meaning of the present invention if at most 90%, preferably at most 95%, of the functional groups which are capable of a crosslinking of polymers or polymer mixtures, preferably binders or binder mixtures, contained in the at least one upper layer not yet completely cured at least in areas have a crosslinking.

Preferably, the at least one upper layer not yet completely cured at least in areas has free, reactive groups and/or capped, reactive groups which liberate the corresponding reactive group again at a temperature from a range of from 30° C. to 180° C.

By the term "free, reactive group" is preferably meant a functional group which can form a covalent bond during a polymerization reaction.

Suitable reactive groups are preferably isocyanate groups (—NCO) and/or groups that are reactive to isocyanate groups, preferably amino groups (—NH$_2$) and/or hydroxyl groups (—OH).

Preferably, capped, reactive groups, which can also be called blocked, reactive groups, are addition compounds of blocking agents and above-named reactive groups which liberate the corresponding reactive group again at a temperature from a range of from 30° C. to 180° C., preferably at a temperature from a range of from 40° C. to 160° C., further preferably at a temperature from a range of from 60° C. to 140° C.

Capped, reactive groups are preferably capped isocyanate groups which liberate the corresponding reactive group, preferably isocyanate group, again at a temperature from a range of from 30° C. to 180° C.

For example, the at least one upper layer not yet completely cured at least in areas can contain free, reactive isocyanate groups. Free, reactive isocyanate groups can react in the presence of water, for example humidity, forming a carbamic acid, which can undergo further polymerization reactions.

Preferably by arranging a carrier ply which comprises at least one carrier layer made of a polyester, a polyolefin or a combination thereof, in particular made of PET, on the at least one upper layer of the transfer ply not yet completely cured at least in areas, the ingress of water, for example humidity, into the at least one upper layer not yet completely cured at least in areas is therefore suppressed, preferably prevented.

Further preferably, the at least one upper layer not yet completely cured at least in areas has no free, ethylenically unsaturated groups.

Preferably, the carrier layer can be formed as an endless film or as a separated film sheet. Such a film sheet can be obtained from a film previously present in endless form by separation.

Preferably, the at least one carrier layer has a layer thickness of from 10 μm to 75 μm, further preferably from 23 μm to 40 μm.

Further preferably, the carrier ply, preferably the at least one carrier layer made of a polyester, a polyolefin or a combination thereof, in particular made of PET, is arranged on the at least one upper layer of the transfer ply not yet completely cured at least in areas with an adhesiveness, preferably determined with a Z006 measuring instrument from Zwick, from a range of from 2 cN to 50 cN, preferably from a range of from 5 cN to 35 cN.

During the measurement of the adhesiveness of the carrier ply to the at least one upper layer with a Z006 measuring instrument from Zwick, in a first step a coated test piece is preferably produced by strongly adhesive application of a transfer film in a width of 3.5 cm to a plastic plate as test substrate by means of hot stamping.

During the measurement, in a second step the carrier ply is preferably peeled off the test piece, preferably arranged horizontally, vertically over a length of 100 mm. In the process the required forces in the area of the length of from 10 mm to 90 mm of the applied carrier film are preferably measured with a Z006 measuring instrument from Zwick GmbH & Co. KG (Ulm, Del.).

To measure the adhesiveness of the carrier ply, the above-named Z006 measuring instrument is preferably combined with a horizontal substrate receiver. The substrate receiver preferably has a movable slide, to which a test substrate is attached. The transfer film is preferably applied to the test substrate, in particular by means of hot stamping. The carrier ply of the applied transfer film is preferably deflected from the horizontal into the vertical by means of a deflection roller and attached to the above-named measuring instrument. During the measurement and of the force of the measuring instrument preferably acting vertically as uniformly as possible on the carrier ply, the slide with the test substrate is moved or pulled correspondingly such that it is possible to peel the carrier ply off the transfer ply applied to the test substrate.

The design of the at least one carrier layer made of a polyester, a polyolefin or a combination thereof, in particular made of polyethylene terephthalate (PET), leads to a significant reduction in the adhesion of the at least one carrier layer to the at least one upper layer of the transfer ply not yet completely cured at least in areas, because the two layers differ markedly in their chemical structure.

The molecular interactions between the carrier layer made of the material specified above and the at least one upper layer of the transfer ply not yet completely cured at least in areas are preferably extremely weakly pronounced.

The carrier ply, preferably the at least one carrier layer made of a polyester, a polyolefin or a combination thereof, in particular made of PET, can thus easily be detached from the transfer ply, preferably without damaging the transfer ply, for example after the application of the transfer film to a substrate and/or the processing of the transfer film by means of hot stamping or injection molding, for example 3DHS (3DHS=3D hot stamping), IMD methods, insert-molding methods, IPD-Skin methods.

It is further advantageous if the transfer film at least partially has a detachment layer, in particular made of a wax, with a layer thickness of from 1 nm to 50 nm, preferably from 1 nm to 20 nm, which is arranged between the at least one carrier layer and the at least one upper layer not yet completely cured at least in areas. Such a detachment layer makes it easier to detach the carrier ply after the absorption layer has been transferred onto a substrate.

The detachment of the carrier ply from the transfer ply is further preferably effected at a layer boundary between the detachment layer and the at least one upper layer of the transfer ply not yet completely cured at least in areas. Advantageously, the wax-based detachment layer remains on the carrier ply.

After the, preferably complete, removal of the carrier ply in step b) of the method according to the invention, the application of at least one protective layer to the at least one upper layer not yet completely cured at least in areas is effected, preferably directly, in step c) by at least partial flooding and/or dousing of the at least one upper layer with at least one solvent-containing, preferably flowable, polyurethane-containing composition and subsequent curing, preferably at a temperature from a range of from 25° C. to 180° C.

Preferably, the at least one upper layer not yet completely cured at least in areas and/or the protective layer applied thereto is cured, preferably completely cured.

Further preferably, the at least one upper layer not yet completely cured at least in areas and the protective layer applied thereto are cured, preferably completely cured.

The at least one solvent-containing, preferably flowable, polyurethane-containing composition applied to the at least one upper layer of the transfer ply not yet completely cured at least in areas preferably also has free, reactive groups and/or capped, reactive groups which liberate the corresponding reactive group again at a temperature from a range of from 30° C. to 180° C.

During the curing, preferably complete curing, of the at least one upper layer of the transfer ply not yet completely cured at least in areas and/or of the protective layer applied thereto, for example free isocyanate groups which are contained in the upper layer of the transfer ply can therefore react with free groups, reactive to isocyanate groups, of the solvent-containing, preferably flowable, polyurethane-containing composition used to produce the at least one protective layer.

If the at least one upper layer of the transfer ply not yet completely cured at least in areas has, for example, free groups reactive to isocyanate groups, these can react correspondingly with free isocyanate groups of the solvent-containing, preferably flowable, polyurethane-containing composition used to produce the at least one protective layer.

In each case the adhesion of the at least one protective layer to the at least one upper layer of the transfer ply is thereby preferably significantly improved after the curing in step c) of the method according to the invention.

If the at least one upper layer not yet completely cured at least in areas has, for example, capped, reactive groups, these preferably liberate the corresponding reactive groups again in step c) in the method according to the invention, preferably at a temperature from a range of from 30° C. to 180° C. Then for example liberated isocyanate groups which are contained in the at least one upper layer of the transfer ply can likewise react with free groups, reactive to isocyanate groups, of the solvent-containing, preferably flowable, polyurethane-containing composition used to produce the at least one protective layer.

The adhesion of the at least one protective layer to the upper layer of the transfer ply is thereby preferably significantly improved, wherein furthermore through the presence of capped, reactive groups, for example capped isocyanate groups, in the at least one upper layer of the transfer ply, not yet completely cured at least in areas, of a transfer film according to the invention the storage stability of a transfer film according to the invention can preferably be increased.

Preferably, the at least one protective layer adheres to the at least one upper layer of the transfer ply after the curing with an adhesiveness, determined according to the method described in DIN EN ISO 4624: 2016-08, preferably with a PosiTest® AT Series pull-off adhesion tester from DeFelsko Corporation (Ogdensburg, N.Y., USA) using a 20 mm dolly, from a range of from 2.5 MPa to 5 MPa, in particular from 2.5 MPa to 10 MPa.

After the curing, the at least one protective layer therefore cannot be detached from a film-coated item according to the invention without damaging the transfer ply and/or detaching the transfer ply from the corresponding substrate.

Furthermore, a simple method for producing the at least one protective layer is provided in particular through the application of the protective layer in step c) of the method according to the invention by at least partial flooding and/or dousing of the at least one upper layer of the transfer ply not yet completely cured at least in areas with a solvent-containing, preferably flowable, polyurethane-containing composition.

The flooding and/or dousing preferably enables the use of a large number of different solvent-containing, preferably flowable, polyurethane-containing compositions, which can be matched, for example specifically, to the composition of the at least one upper layer of the transfer ply not yet completely cured at least in areas and/or to the properties to be achieved by the at least one protective layer, for example in terms of optical properties, mechanical properties and/or chemical resistance.

As explained above, the at least one upper layer not yet completely cured at least in areas preferably has free, reactive groups and/or capped, reactive groups which liberate the corresponding reactive group again at a temperature from a range of from 30° C. to 180° C.

Methods for determining the content of free amino groups, hydroxyl groups and/or isocyanate groups in raw materials for the production of plastics are known in the state of the art.

Suitable methods for determining the free hydroxyl group content are described, for example, in ASTM E1899-16 ("Standard Test Method for Hydroxyl Groups Using Reaction with p-Toluenesulfonyl Isocyanate (TSI) and Potentiometric Titration with Tetrabutylammonium Hydroxide", 2016, ASTM International, West Conshohocken, Pa., USA), ASTM D4273-11 ("Standard Test Method for Polyurethane Raw Materials: Determination of Primary Hydroxyl Content of Polyether Polyols", 2011, ASTM International, West Conshohocken, Pa., USA), DIN 53240-3:2016-03 ("Bindemittel für Beschichtungsstoffe—Bestimmung der Hydroxylzahl—Teil 3: Schnellverfahren", issue date: 2016-03 ["Binders for paints and varnishes—Determination of Hydroxyl Value—Part 3: Rapid Test"]), ISO 14900:2017-03 ("Plastics—Polyols for use in the production of polyurethane—Determination of hydroxyl number", issue date: 2017-03) or ASTM D4274-16 ("Standard Test Methods for Testing Polyurethane Raw Materials: Determination of Hydroxyl Numbers of Polyols", 2016, ASTM International, West Conshohocken, Pa., USA).

Suitable methods for determining the free isocyanate group content are described, for example, in DIN EN ISO 14896:2009-07 ("Kunststoffe—Polyurethanrohstoffe—Bestimmung des Isocyanatanteils", issue date 2009-07 ["Plastics—Polyurethane raw materials—Determination of isocyanate content"]) or ASTM D2572-97(2010) ("Standard Test Method for Isocyanate Groups in Urethane Materials or Prepolymers", 2010, ASTM International, West Conshohocken, Pa., USA).

A suitable method for determining the free amino group content is described, for example, in ASTM D2074-07 (2013) ("Standard Test Methods for Total, Primary, Secondary, and Tertiary Amine Values of Fatty Amines by Alternative Indicator Method", 2013, ASTM International, West Conshohocken, Pa., USA).

Preferably, free, reactive groups, preferably free isocyanate groups and/or free groups reactive to isocyanate groups, preferably amino groups and/or hydroxyl groups, or correspondingly capped analogs of the at least one upper layer not yet completely cured at least in areas are bound to monomers, prepolymers and/or mixtures thereof contained in the layer.

Further preferably, free, reactive groups, preferably free isocyanate groups and/or free groups reactive to isocyanate groups, preferably amino groups and/or hydroxyl groups, and/or correspondingly capped analogs thereof of the at least one upper layer not yet completely cured at least in areas are bound to binders, crosslinking agents and/or mixtures thereof contained in the upper layer.

The at least one upper layer not yet completely cured at least in areas preferably comprises at least one binder which has free isocyanate groups and/or free groups reactive to isocyanate groups, preferably amino groups and/or hydroxyl groups, and/or in each case correspondingly capped analogs thereof.

Suitable binders are preferably selected from the group which consists of polyurethane resins, polyurethane dispersions, phenolic resins, epoxy resins, polyureas, melamine resins, aminoplasts, polyester resins, alkyd resins, polyamide resins and mixtures thereof, further preferably polyurethane resins, polyurethane dispersions, phenolic resins, polyureas, melamine resins, aminoplasts, polyester resins, alkyd resins, polyamide resins and mixtures thereof.

Further preferably, the at least one upper layer not yet completely cured at least in areas comprises the at least one binder which has free isocyanate groups and/or free groups reactive to isocyanate groups, preferably amino groups and/or hydroxyl groups, and/or in each case correspondingly capped analogs thereof, in a proportion of at least 15 wt.-%, preferably from a range of from 20 wt.-% to 90 wt.-%, in each case relative to the total weight of the layer.

Further preferably, the at least one binder which is contained in the at least one upper layer not yet completely cured at least in areas has no free, ethylenically unsaturated groups.

In a preferred embodiment, the at least one upper layer not yet completely cured at least in areas comprises or consists of at least one aqueous, uncrosslinked or crosslinked polyurethane dispersion, which preferably has free groups reactive to isocyanate groups, further preferably amino groups and/or hydroxyl groups, or at least one uncrosslinked or crosslinked polyurethane resin, which preferably has isocyanate groups and/or capped analogs thereof or groups reactive to isocyanate groups, further preferably amino groups and/or hydroxyl groups, and/or in each case correspondingly capped analogs thereof.

Capped, reactive groups can also be called capped analogs of above-named free groups reactive to isocyanate groups or capped analogs of above-named isocyanate groups.

Suitable compounds with capped, reactive groups are known in the state of the art and comprise, for example, isocyanate groups which have been blocked (capped) by addition of organic compounds having acidic H atoms, so-called blocking agents.

Suitable blocking agents having acidic H atoms are, for example, malonic acid dialkyl esters with alkyl groups which in each case can be identical to or different than one another and have 1 to 4 carbon atoms, acetoacetic acid alkyl esters with an alkyl group which has 1 to 4 carbon atoms, phenol derivatives, secondary amines, lactams, pyrazoles, oximes or mixtures thereof.

Examples of suitable malonic acid dialkyl esters are malonic acid dimethyl ester, malonic acid diethyl ester, malonic acid diisopropyl ester, malonic acid di-tert.-butyl ester and mixtures thereof.

Examples of suitable acetoacetic acid alkyl esters are acetoacetic acid methyl ester, acetoacetic acid ethyl ester, acetoacetic acid isopropyl ester, acetoacetic acid tert.-butyl ester and mixtures thereof.

Examples of suitable phenol derivatives are phenol, cresols, nonylphenols and mixtures thereof.

Examples of suitable secondary amines are N-isopropyl-N-methylamine, N-isopropyl-N-ethylamine, N-tert-butyl-N-methylamine, N-tert-butyl-N-isopropylamine, N,N-diisopropylamine, N-tert-butyl-N-benzylamine (BEBA), N,N-dicyclohexylamine and mixtures thereof.

One example of suitable lactams is ε-caprolactam. One example of suitable pyrazoles is 3,5-dimethylpyrazole (DMP).

Examples of suitable oximes are aromatic aldoximes, aliphatic, cycloaliphatic or aromatic ketoximes and mixtures thereof. Examples of suitable aromatic aldoximes are benzaldoxime, tolylaldoxime, terephthaldialdoxime, isophthaldialdoxime and mixtures thereof. Suitable ketoximes are, for example, acetone oxime, methyl ethyl ketoxime, methyl propyl ketoxime, 2-butanone oxime, methyl isobutyl ketoxime, 3-methyl-2-butanone oxime, diisobutyl ketoxime, 2-pentanone oxime, 3-pentanone oxime, 4-methyl-2-pentanone oxime, 2-heptanone oxime, 3-heptanone oxime, ethyl hexyl ketoxime, cyclohexanone oxime, acetophenone oxime, benzophenone oxime and mixtures thereof.

Preferably, above-named compounds with capped, reactive groups can be used together with at least one catalyst. All known compounds which can catalyze isocyanate reactions can be used as catalysts. Examples thereof are titanates such as tetrabutyl titanate and tetrapropyl titanate, tin carboxylates such as dibutyltin dilaulate (DBTL), dibutyltin diacetate, tin octoate; tin oxides such as dibutyltin oxide and dioctyltin oxide; organoaluminum compounds such as aluminum trisacetylacetonate, aluminum trisethyl acetoacetate; chelate compounds such as titanium tetraacetylacetonate; amine compounds such as triethylenediamine, guanidine, diphenylguanidine, 2,4,6-tris(dimethylaminomethyl)phenol, morpholine, N-methylmorpholine, 2-ethyl-4-methylimidazoles, and 1,8-diazabicyclo-(5,4,0)undecene-7 (DBU), 1,4-diazabicyclo[2,2,2]octane, N,N-dimethylpiperazine, 1,8-diazabicyclo[5.4.0]undec-7-ene, dimorpholinodimethyl ether, dimorpholinodiethyl ether (DMDEE) or mixtures thereof. The presence of one of the above-named catalysts preferably leads to a reduction in the temperature necessary for liberating the corresponding reactive group from the corresponding capped analog.

The term "prepolymer" preferably denotes reactive oligomers which preferably serve to produce binders contained in the upper layer, preferably polyurethane polymers. Prepolymers can have, for example, at least two identical groups, preferably at least two free isocyanate groups and/or at least two free groups reactive to isocyanate groups, for example amino and/or hydroxyl groups, and/or in each case correspondingly capped analogs thereof.

The at least one upper layer not yet completely cured at least in areas can be produced, for example, by reaction of at least one compound having two or more isocyanate groups with at least one compound which has two or more groups reactive to isocyanate groups, for example hydroxyl groups and/or amino groups, wherein an excess of preferably either the at least one compound having two or more isocyanate groups or the at least one compound which has two or more groups reactive to isocyanate groups is used.

Suitable compounds having two or more isocyanate groups are known and comprise, for example, monomeric isocyanates having two or more isocyanate groups, isocyanate adducts, isocyanate prepolymers having two or more isocyanate groups or mixtures thereof.

Monomeric isocyanates having two or more isocyanate groups are, for example, aliphatic isocyanates having two or more isocyanate groups, cycloaliphatic isocyanates having two or more isocyanate groups, aromatic isocyanates having two or more isocyanate groups, adducts thereof, or mixtures thereof, for example 1,6-hexamethylene diisocyanate (HDI), isophorone diisocyanate (IPDI), 2,4-toluylene diisocyanate, 2,6-toluylene diisocyanate, 2,4'-diphenylmethane diisocyanate, 2,2'-diphenylmethane diisocyanate, 4,4'-diphenylmethane diisocyanate, naphthylene diisocyanate (NDI), 4,4'-diisocyanatodicyclohexylmethane (H12MDI), xylylene diisocyanate (XDI), tetramethylxylylene diisocyanate (TMXDI), pentamethylene diisocyanate (PDI), 1,3-phenylene diisocyanate, 1,4-phenylene diisocyanate, adducts thereof or mixtures thereof.

Isocyanate adducts are commercially available and preferably form by dimerization or trimerization of one of the above-named aliphatic diisocyanates, cycloaliphatic diisocyanates or aromatic diisocyanates.

For example, the trimer of 1,6-hexamethylene diisocyanate (HDI), which is also known as HDI-biuret, can be obtained commercially from Covestro AG (Leverkusen, Del.) under the trade name Desmodur® N.

Suitable compounds having two or more isocyanate groups are, for example, isocyanate prepolymers which have two or more isocyanate groups.

Isocyanate prepolymers are commercially available and can preferably be obtained by reaction of at least one of the above-named aliphatic diisocyanates, cycloaliphatic diisocyanates, aromatic diisocyanates, adducts thereof or mixtures thereof with at least one di- or polyol, wherein a molar excess of the diisocyanate used is preferably used, relative to the number of free OH groups of the di- or polyol used.

Isocyanate prepolymers thus preferably have urethane groups as well as free, reactive isocyanate groups, which can preferably be at least partially capped, in the polymer chain.

Isocyanate prepolymers can furthermore be partially converted to allophanates and/or biurets by increasing the temperature.

Suitable compound with two or more hydroxide groups are polyhydric alcohols which are selected, for example, from the group which consists of alkanediols, alkanetriols, alkanetetraols, polyester polyols, polyether polyols, and mixtures thereof.

Suitable polyester polyols are preferably reaction products of polyfunctional, preferably difunctional alcohols, optionally together with small quantities of trifunctional alcohols, and polyfunctional, preferably difunctional and/or trifunctional carboxylic acids. Instead of free polycarboxylic acids the corresponding polycarboxylic anhydrides or corresponding polycarboxylic acid esters with alcohols having preferably 1 to 3 C atoms can also be used. The polyols and carboxylic acids known per se for the production of polyesters can be selected. For example, diols suitable for the production of such polyester polyols are ethylene glycol, 1,2-propanediol, 1,3-propanediol, 1,2-butanediol, 1,4-butanediol, pentanediol, the isomeric hexanediols, octanediol, 1,4-hydroxymethyl-cyclohexane, 2-methyl-1,3-propanediol, butanetriol-1,2,4, triethylene glycol, tetraethylene glycol, polyethylene glycol, dipropylene glycol, polypropylene glycol, dibutylene glycol or polybutylene glycol. Aromatic diols can also be used.

The polycarboxylic acids used can be aliphatic, cycloaliphatic, aromatic or heterocyclic or both. They can optionally be substituted, for example by alkyl groups, alkenyl groups, ether groups or halogens. For example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, glutaric anhydride, maleic acid, maleic anhydride, fumaric acid or mixtures of two or more thereof are suitable as polycarboxylic acids. For example, citric acid or trimellitic acid are suitable as tricarboxylic acids which can optionally be contained proportionately. All named acids can be used individually or as mixtures of two or more thereof.

However, polyester polyols of oleochemical origin can also be used. Such polyester polyols can be produced, for example, by complete ring opening of epoxidized triglycerides of an at least partially olefinically unsaturated fatty acid-containing fat mixture with one or more alcohols having 1 to 12 C atoms and subsequent partial transesterification of the triglyceride derivatives to give alkyl ester polyols having 1 to 12 C atoms in the alkyl radical.

Further suitable polyester pols are polycarbonate polyols. Polycarbonates can be obtained, for example, through the reaction of diols, such as propylene glycol, butanediol-1,4 or hexanediol-1,6, diethylene glycol, triethylene glycol or tetraethylene glycol or mixtures or two or more thereof with diaryl carbonates, for example diphenyl carbonate, or with phosgene. A further group of suitable polyols are polylactones, for example polyesters based on ε-caprolactone. Polyester polyols which contain one or more urethane groups in the molecular chain are also suitable.

Suitable polyether polyols are, for example, reaction products of low-molecular-weight polyfunctional alcohols with alkylene oxides. The alkylene oxides preferably have 2 to 4 C atoms. For example, the reaction products of ethylene oxide, propylene oxide, butylene oxide or mixtures thereof with aliphatic diols, such as ethylene glycol, 1,2-propanediol, 1,3-propanediol, the isomeric butanediols, hexanediols, 2,2-dimethyl-1,3-propanediol, 2-methylpropanediol, 1,6-hexanediol, 2,4,4-trimethylhexanediol-1,6, 2,2,4-trimethylhexanediol-1,6, 1,4-cyclohexanedimethanol, or aromatic diols, such as 4,4'-dihydroxydiphenylpropane, bisphenol A, bisphenol F, pyrocatechol, resorcinol, hydroquinone or mixtures of two or more thereof are suitable. Furthermore the reaction products of polyfunctional alcohols, such as glycerol, trimethylolethane or trimethylolpropane, pentaerythritol or sugar alcohols with the alkylene oxides may also be suitable.

Further suitable polyols form by polymerization of tetrahydrofuran.

Furthermore above-named polyether polyols or polyester polyols, preferably polyether polyols, can be amino-functionalized, wherein one or more hydroxide groups are preferably replaced by one or more amino groups, primary amino groups and/or secondary amino groups.

For example, amino-functionalized polyether polyols, which can also be called amino-terminated polyethers, are known to a person skilled in the art and can be obtained commercially from Huntsman Corporation (The Woodlands, Tex., USA), for example under the name JEFFAMINE®.

Preferably, the at least one upper layer not yet completely cured at least in areas can comprise or consist of isocyanate prepolymers, which can be crosslinked or uncrosslinked, capped isocyanate prepolymers, which can be crosslinked or uncrosslinked, or mixtures thereof, wherein above-named isocyanate prepolymers or capped isocyanate prepolymers can contain traces of monomeric diisocyanates and/or adducts thereof, preferably in a proportion of less than 5 wt.-%, preferably less than 1 wt.-%, in each case relative to the total weight of the prepolymer used.

Prepolymers with free groups reactive to isocyanate groups, further preferably amino groups and/or hydroxyl groups, can preferably be obtained by reaction of at least one of the above-named aliphatic diisocyanates, cycloaliphatic diisocyanates, aromatic diisocyanates, adducts thereof or mixtures thereof with at least one diol, polyol and/or amino-functionalized polyether polyol, wherein a molar excess of the diols, polyols and/or amino-functionalized polyether polyols used is preferably used, relative to the number of free isocyanate groups of the diisocyanate used.

Prepolymers with free groups reactive to isocyanate groups thus preferably have urethane groups as well as free, reactive hydroxyl groups and/or amino groups, which can preferably be at least partially capped, for example by thermally reversible addition of isocyanate, in the polymer chain.

Alternatively, the at least one upper layer not yet completely cured at least in areas can comprise or consist of prepolymers with free groups reactive to isocyanate groups, which can be crosslinked or uncrosslinked, prepolymers with capped groups reactive to isocyanate groups, which can be crosslinked or uncrosslinked, or mixtures thereof, wherein above-named prepolymers can contain traces of diols, polyols and/or amino-functionalized polyether polyols used, preferably in a proportion of less than 5 wt.-%, preferably less than 1 wt.-%, in each case relative to the total weight of the prepolymer used.

Further preferably, above-named isocyanate prepolymers, capped isocyanate prepolymers, prepolymers with free groups reactive to isocyanate groups, and/or prepolymers with capped groups reactive to isocyanate groups of the at least one upper layer not yet completely cured at least in areas can be crosslinked through the use of suitable crosslinking agents, for example polyfunctional aziridines (PFA).

Furthermore the at least one upper layer not yet completely cured at least in areas can have at least one co-binder which is preferably selected from the group which consists of acrylic resins, methacrylic resins, vinyl ester resins and mixtures thereof and further preferably has no free, ethylenically unsaturated groups.

Further preferably, the at least one upper layer not yet completely cured at least in areas has the at least one co-binder in a proportion from a range of at most 30 wt.-%, further preferably at most 25 wt.-%, preferably from a range of from 5 wt.-% to 20 wt.-%, in each case relative to the total weight of the layer.

Furthermore the at least one upper layer not yet completely cured at least in areas can contain at least one crosslinking agent which preferably has at least two free isocyanate groups and/or at least two free groups reactive to isocyanate groups, for example amino and/or hydroxyl groups.

Suitable crosslinking agents are known and comprise organic compounds with two or more free, reactive groups, for example aliphatic or alicyclic compounds with two or more free isocyanate groups, aliphatic or alicyclic compounds with two or more free hydroxide groups, aliphatic or alicyclic compounds with two or more free amine groups, in each case correspondingly capped analogs thereof or mixtures thereof.

Further preferably, the at least one upper layer not yet completely cured at least in areas has the at least one crosslinking agent in a proportion from a range of at most 15 wt.-%, further preferably at most 12 wt.-%, preferably from a range of from 1 wt.-% to 10 wt.-%, in each case relative to the total weight of the layer.

Preferably, the at least one upper layer not yet completely cured at least in areas contains at least one, preferably inorganic, filler in a proportion of at most 15 wt.-%, preferably from a range of from 0.1 wt.-% to 12 wt.-%, further preferably from a range of from 1 wt.-% to 10 wt.-%, in each case relative to the total weight of the layer.

Preferably, the at least one upper layer not yet completely cured at least in areas contains at least one, preferably organic, additive, for example at least one wetting agent, at least one leveling agent, at least one defoamer, at least one thixotropic agent or a mixture thereof, preferably in a proportion of at most 12 wt.-%, preferably from a range of from 0.1 wt.-% to 10 wt.-%, in each case relative to the total weight of the layer.

Further preferably, the at least one upper layer not yet completely cured at least in areas has a thickness from a range of from 0.5 μm to 15 μm, further preferably from a range of from 1 μm to 12 μm.

Preferably, the at least one upper layer not yet completely cured at least in areas comprises no photoinitiators.

Photoinitiators are chemical compounds which, after absorption of light, decompose in a photolysis reaction and thus form reactive species which can initiate a reaction, for example a polymerization. The reactive species can be free radicals, anions or cations.

Further preferably, the at least one upper layer not yet completely cured at least in areas comprises no photoinitiators and no binders with free, ethylenically unsaturated groups.

In a preferred embodiment, a first adhesion-promoter layer, which preferably has a layer thickness from a range of from 0.1 µm to 10 µm, further preferably from a range of from 1 µm to 4 µm, is arranged between the at least one upper layer of the transfer ply not yet completely cured at least in areas and the at least one decorative element which is preferably arranged in at least one of the above-named decorative layers or forms the latter.

Preferably, the first adhesion-promoter layer comprises or consists of at least one acrylic resin.

Preferably, the first adhesion-promoter layer increases the adhesion between the at least one upper layer of the transfer ply not yet completely cured at least in areas and the at least one decorative element which is preferably arranged in at least one of the above-named decorative layers or forms the latter.

Further preferably, the transfer ply of a transfer film according to the invention furthermore has at least one varnish layer, which is arranged on the surface of the transfer ply facing away from the carrier ply, preferably forms the latter.

The at least one varnish layer preferably has a layer thickness from a range of from 0.5 µm to 10 µm, further preferably from a range of from 1 µm to 5 µm.

The at least one varnish layer can be formed as a primer layer, for example based on acrylonitrile butadiene styrene copolymers (abbreviation: ABS) or polyvinyl chloride (abbreviation: PVC), and/or as an adhesive layer.

Further preferably, the at least one varnish layer comprises or consists of at least one adhesive which is selected from the group which consists of physically curing adhesives, chemically curing adhesives, pressure-sensitive adhesives or mixture thereof.

Preferably, the at least one varnish layer promotes the adhesion between the at least one decorative element which is preferably arranged in at least one of the above-named decorative layers or forms the latter and a substrate joined to the transfer ply. Preferably, the at least one varnish layer of the transfer ply serves to fix the transfer ply on a substrate.

Further preferably, in each case independently of one another, dyes can be dissolved and/or pigments, for example colored pigments, metallic pigments, effect pigments, fluorescent pigments, thermochromic pigments or mixtures thereof, can be arranged in the at least one varnish layer and/or in the first adhesion-promoter layer of the transfer ply.

A transfer film according to the invention is preferably produced by sequential application, preferably over the whole surface or partially, of the individual layers of the transfer ply to the transfer ply by methods known in the state of the art, for example by printing methods such as gravure printing, screen printing, flexographic printing, inkjet printing or offset printing, and/or by casting methods such as slot casting.

Furthermore, the application, preferably over the whole surface or partially, of vapor-deposited and/or printed-on metal layers and/or metal oxide layers as decorative element or decorative layer is possible. Vapor-deposited metal and/or metal oxide layers can, for example, be applied by methods known in the state of the art, for example physical vapor deposition (PVD) or chemical vapor deposition (CVD).

Further preferably, after molding an optically active surface structure into a replication layer, at least one decorative layer is vapor-deposited, preferably in each case in areas or over the whole surface, on the replication layer.

The application over the whole surface followed by a removal of the at least one decorative layer in areas by means of known methods such as washing methods or lift-off varnishes or etching methods or mask exposure methods with the aid of a photoresist layer is also possible.

Preferably, the at least one upper layer of the transfer ply not yet completely cured at least in areas is first arranged on or applied to the transfer ply which comprises at least one carrier layer made of a polyester, a polyolefin or a combination thereof, in particular made of PET, by at least one of the above-named printing and/or casting methods.

For example, the at least one upper layer not yet completely cured at least in areas can be applied to the carrier ply as a mixture, wherein the mixture preferably comprises or consists of:

a) at least one binder which is preferably selected from the group which consists of polyurethane resins, polyurethane dispersions, phenolic resins, epoxy resins, polyureas, melamine resins, aminoplasts, polyester resins, alkyd resins, polyamide resins and mixtures thereof, further preferably polyurethane resins, polyurethane dispersions, phenolic resins, polyureas, melamine resins, aminoplasts, polyester resins, alkyd resins, polyamide resins and mixtures thereof, b) optionally, at least one co-binder which is preferably selected from the group which consists of acrylic resins, methacrylic resins, vinyl ester resins and mixtures thereof and further preferably has no free, ethylenically unsaturated groups, c) optionally, at least one of the above-named crosslinking agents, d) optionally, at least one of the above-named, preferably inorganic, fillers, e) optionally, at least one of the above-named, preferably organic, additives, and f) optionally, at least one solvent, preferably water and/or at least one organic solvent.

Preferably, the mixture used to produce the at least one upper layer not yet completely cured at least in areas comprises or consists of:
20 wt.-% to 90 wt.-% of at least one of the above-named binders,
5 wt.-% to 25 wt.-% of at least one of the above-named co-binders,
0 wt.-% to 10 wt.-% of at least one of the above-named crosslinking agents,
0 wt.-% to 10 wt.-% of at least one of the above-named fillers,
0 wt.-% to 10 wt.-% of at least one of the above-named additives, and
10 wt.-% to 50 wt.-% of at least one solvent, in each case relative to the total weight of the mixture.

For example, the at least one upper layer not yet completely cured at least in areas can be applied to the carrier ply, as described above, as a mixture of at least one of the above-named compounds having two or more isocyanate groups and at least one of the above-named compounds which has two or more groups reactive to isocyanate groups, wherein a molar excess of preferably either the at least one compound having two or more isocyanate groups or the at least one compound which has two or more groups reactive to isocyanate groups is used.

Preferably, the reaction of the at least one compound having two or more isocyanate groups and the at least one compound which has two or more groups reactive to isocyanate groups is effected before, during or after the application of the above-named mixture.

Further preferably, the application of the at least one upper layer not yet completely cured at least in areas is effected by application of at least one flowable, preferably solvent-containing, isocyanate-containing composition which comprises or consists of above-named isocyanate prepolymers, which can be crosslinked or uncrosslinked, above-named capped isocyanate prepolymers, which can be crosslinked or uncrosslinked, or mixtures thereof.

A flowable, preferably solvent-containing, isocyanate-containing composition preferably has a dynamic viscosity at 25° C. from a range of from 2 mPa·s to 1500 mPa·s, preferably from 10 mPa·s to 1000 mPa·s, further preferably from 10 mPa·s to 500 mPa·s, preferably determined according to the method described in DIN EN ISO 3219:1994-10 ("Kunststoffe—Polymere/Harze in flüssigem, emulgiertem oder dispergiertem Zustand—Bestimmung der Viskositat mit einem Rotationsviskosimeter bei definiertem Geschwindigkeitsgefälle" issue date 1994-10 ["Plastics—Polymers/resins in the liquid state or as emulsions or dispersions—Determination of viscosity using a rotational viscometer with defined shear rate"]), for example using a HAAKE Viscotester® VT550 (Thermo Fischer Scientific Inc., Waltham, Mass., USA), further preferably using a cylindrical measuring device NV and a measuring beaker NV.

A flowable, preferably solvent-containing, isocyanate-containing composition preferably comprises at least one organic solvent, for example ethyl acetate, 2-butanone, acetone, toluene, xylenes or mixtures thereof.

Further preferably, an isocyanate-containing composition, which comprises above-named isocyanate prepolymers, is anhydrous. Above-named capped isocyanate prepolymers can, by contrast, be present as an aqueous dispersion.

Alternatively, the application of the at least one upper layer not yet completely cured at least in areas can be effected by application of at least one flowable, preferably solvent-containing, composition reactive to isocyanate groups which comprise or consist of above-named prepolymers with free groups reactive to isocyanate groups, which can be crosslinked or uncrosslinked, above-named prepolymers with capped groups reactive to isocyanate groups, which can be crosslinked or uncrosslinked, or mixtures thereof.

A flowable, preferably solvent-containing, composition reactive to isocyanate groups preferably has a dynamic viscosity at 25° C. from a range of from 2 mPa·s to 1500 mPa·s, preferably from 10 mPa·s to 1000 mPa·s, further preferably from 10 mPa·s to 500 mPa·s, preferably determined according to the method described in DIN EN ISO 3219:1994-10, for example using a HAAKE Viscotester® VT550, further preferably using a cylindrical measuring device NV and a measuring beaker NV.

A flowable, preferably solvent-containing, composition reactive to isocyanate groups preferably comprises water and/or at least one organic solvent, for example ethyl acetate, 2-butanone, acetone, toluene, xylenes or mixtures thereof.

For example, a flowable, preferably solvent-containing, composition reactive to isocyanate groups can be present as an aqueous dispersion.

Alternatively, the at least one flowable, isocyanate-containing composition and/or the at least one flowable composition reactive to isocyanate groups can be designed as a thixotropically stable paste, which can preferably be converted from a solid or pasty consistency into a flowable consistency through mechanical action such as stirring, shaking, preparation using a spatula or doctor blade and preferably have a solid or pasty consistency again after being deposited.

At least the at least one decorative element on the side facing away from the carrier ply of the at least one upper layer not yet completely cured at least in areas is then arranged on the at least one upper layer of the transfer ply not yet completely cured at least in areas.

For example, the arrangement of the at least one decorative element on the side facing away from the carrier ply of the at least one upper layer not yet completely cured at least in areas can be effected by placing at least one suitable decorative element on the at least one upper layer of the transfer ply not yet completely cured at least in areas.

Preferably, the at least one decorative element is arranged, for example dissolved and/or dispersed, in at least one decorative layer, which comprises, in each case independently of one another, a UV-crosslinked varnish or a thermoplastically deformable layer and which is, in each case independently of one another, unpigmented or pigmented. The at least one decorative element can furthermore form at least one decorative layer, for example a metal layer and/or metal oxide layer vapor-deposited and/or printed on preferably over the whole surface or partially.

Further preferably, a first adhesion-promoter layer is arranged between the at least one upper layer of the transfer ply not yet completely cured at least in areas and the at least one decorative element or the at least one decorative ply by means of at least one of the above-named printing and/or casting methods.

The adhesion is thereby preferably improved between the at least one upper layer of the transfer ply not yet completely cured at least in areas and the at least one decorative layer which is selected from the group which consists of transparent and/or colored varnish layers, in particular comprising one or more dyes and/or pigments, replication layers with a molded optically active surface structure, reflective layers, in particular opaque reflective layers, transparent reflective layers, metallic reflective layers or dielectric reflective layers, optically variable layers, optically active layers, interference multilayer systems, volume hologram layers, liquid crystal layers, in particular cholesteric liquid crystal layers, electrically conductive layers, antenna layers, electrode layers, magnetic layers, magnetic storage layers, barrier layers and combinations thereof.

Further preferably, at least one varnish layer is finally arranged on the surface of the transfer ply facing away from the carrier ply by means of at least one of the above-named printing and/or casting methods.

The method according to the invention for producing a film-coated article, preferably using a transfer film according to one of claims 1 to 11, wherein the transfer film contains a carrier ply and a transfer ply comprising at least one decorative element and arranged on the carrier ply, comprises the following steps:

a) joining a substrate to at least one surface of the transfer ply facing away from the carrier ply, and
b) removing the carrier ply from the transfer ply bonded to the substrate,
c) applying at least one protective layer to a surface of the transfer ply lying opposite the substrate,
wherein the transfer ply, adjoining the carrier ply, has at least one upper layer, which is not yet completely cured at least in areas, wherein the at least one decorative element is arranged on the side of the at least one upper layer of the transfer ply facing away from the carrier ply, and wherein the application of the at least one protective layer to the at least one upper layer of the transfer ply in step c) is effected by at least partial flooding and/or dousing of the at least one upper layer of the transfer ply with at least one solvent-containing, preferably flowable, polyurethane-containing composition and subsequent curing, preferably at a temperature from a range of from 25° C. to 180° C.

The method according to the invention makes it possible to apply at least one protective layer to different substrates which is preferably selected from the group which consists of paper, plastic, wood, composite, glass, metal and combinations thereof.

In particular, a transfer film according to the invention is used which on the one hand transfers a transfer ply containing at least one decorative element onto at least one surface of a substrate and on the other hand improves the adhesion of at least one protective layer to the substrate.

As stated above, the transfer ply containing at least one decorative element can, depending on the design of the at least one decorative element, influence the physical properties, preferably the haptic, optical, electrical and/or mechanical properties, and/or the chemical properties of the surface of the coated substrate.

The transfer ply containing at least one decorative element furthermore improves the adhesion of a subsequently applied protective layer through specific design of the at least one upper layer, not yet completely cured at least in areas, arranged between the carrier ply and the transfer ply.

Firstly, in step a) of the method according to the invention, a substrate is joined to at least one surface of the transfer ply facing away from the carrier ply, preferably obtaining an at least partially coated item.

Preferably, the joining of a substrate to at least one surface of the transfer ply of the transfer film facing away from the carrier ply in step a) is effected by a1) adhesive bonding, hot stamping, lamination or combinations thereof of at least one surface of the transfer ply facing away from the carrier ply onto at least one surface of a substrate which is selected from the group which of paper, plastic, wood, composite, glass, metal and combinations thereof, or by a2) at least partially covering at least one surface of the transfer ply of the transfer film facing away from the carrier ply with at least one plastic injection-molding composition, wherein the transfer film is arranged in at least one injection mold and the at least one injection mold is filled with at least one plastic injection-molding composition, wherein the plastic injection-molding composition comprises a thermoplastic, a thermosetting plastic or a mixture thereof.

Preferably, in step a) of the method according to the invention, a substrate is joined to at least one surface of the transfer ply facing away from the carrier ply at least partially, preferably over the whole surface.

Suitable plastics and/or plastic injection-molding compositions are preferably selected from the group which consists of acrylonitrile butadiene styrene copolymers (abbreviation: ABS), polycarbonate (abbreviation: PC), a mixture of ABS and PC, polyoxymethylene (abbreviation: POM), polymethyl methacrylate (abbreviation: PMMA), styrene acrylonitrile copolymers (abbreviation: SAN), acrylonitrile styrene acrylate copolymers (abbreviation: ASA), polypropylene (abbreviation: PP), thermoplastic olefin-based elastomers (abbreviation: TPO), polyamides (abbreviation: PA) and mixtures of at least two materials of this group which are compatible with one another.

The lamination of at least one surface of the transfer ply facing away from the carrier ply onto at least one surface of a substrate can be effected for example in the presence of an adhesive or by reaching the glass transition temperature of the layer of the transfer film used for the joining and under appropriate pressure.

Further preferably, the joining of the substrate to at least one surface of the transfer ply facing away from the carrier ply is effected through the at least one varnish layer which is arranged on the surface of the transfer ply facing away from the carrier ply. Further preferably, the at least one varnish layer comprises or consists of at least one adhesive which is selected from the group which consists of physically curing adhesives, chemically curing adhesives, pressure-sensitive adhesives or mixture thereof.

In step b) of the method according to the invention the carrier ply is removed from the transfer ply bonded to the substrate, preferably without leaving a residue.

After the removal of the carrier ply, the at least one upper layer not yet completely cured at least in areas at least partially forms the outer layer of the at least partially coated item.

Further preferably, the at least one upper layer not yet completely cured at least in areas forms a surface of the transfer ply lying opposite the substrate.

In step c) of the method according to the invention at least one protective layer is applied to a surface of the transfer ply lying opposite the substrate, which is at least partially formed by the at least one upper layer of the transfer ply not yet completely cured at least in areas.

The application of the at least one protective layer to the at least one upper layer of the transfer ply in step c) is effected by at least partial flooding and/or dousing of the at least one upper layer of the transfer ply with at least one solvent-containing, preferably flowable, polyurethane-containing composition and subsequent curing.

By the term "flowable polyurethane-containing composition" is preferably meant a polyurethane-containing composition which, preferably at a temperature of 25° C., has a dynamic viscosity from a range of from 2 mPa·s to 1500 mPa·s, preferably from 10 mPa·s to 1000 mPa·s, further preferably from 10 mPa·s to 500 mPa·s, preferably determined according to the method described in DIN EN ISO 3219:1994-10, for example using a HAAKE Viscotester® VT550, further preferably using a cylindrical measuring device NV and a measuring beaker NV.

As described above, the at least one solvent-containing, preferably flowable, polyurethane-containing composition preferably likewise has free, reactive groups, preferably free isocyanate groups or free groups reactive to isocyanate groups, and/or in each case corresponding capped, reactive groups which liberate the corresponding reactive group again at a temperature from a range of from 30° C. to 180° C.

During the curing, preferably complete curing, of the at least one upper layer of the transfer ply not yet completely cured at least in areas and/or of the protective layer applied thereto, for example free isocyanate groups which are contained in the upper layer of the transfer ply can therefore react with free groups, reactive to isocyanate groups, of the solvent-containing, preferably flowable, polyurethane-containing composition used to produce the at least one protective layer.

In each case the adhesion of the at least one protective layer to the at least one upper layer of the transfer ply is thereby preferably significantly improved after the curing in step c) of the method according to the invention.

Further preferably, the at least one solvent-containing, preferably flowable, polyurethane-containing composition is selected from the group which consists of polyurethane-containing dispersions, polyurethane-containing resins, polyurethane solutions, compositions comprising polyurethane precursors (2C PUR systems) and mixtures thereof, which preferably likewise have free, reactive groups, preferably isocyanate groups or groups reactive to isocyanate groups and/or in each case corresponding capped, reactive groups which liberate the corresponding reactive group again at a temperature from a range of from 30° C. to 180° C.

For example, the at least one solvent-containing, preferably flowable, polyurethane-containing composition, as described above, can be applied to the at least one upper layer of the transfer ply as compositions comprising polyurethane precursors (2C PUR systems), in particular as a mixture of at least one of the above-named compounds having two or more isocyanate groups and at least one of the above-named compounds which has two or more groups reactive to isocyanate groups, wherein a molar excess of preferably either the at least one compound having two or more isocyanate groups or the at least one compound which has two or more groups reactive to isocyanate groups is used.

For example, polyurethane-containing dispersions, polyurethane-containing resins and/or polyurethane solutions have above-named prepolymers with free groups reactive to isocyanate groups, which can be crosslinked or uncrosslinked, above-named prepolymers with capped groups reactive to isocyanate groups, which can be crosslinked or uncrosslinked, or mixtures thereof and/or above-named isocyanate prepolymers, which can be crosslinked or uncrosslinked, above-named capped isocyanate prepolymers, which can be crosslinked or uncrosslinked, or mixtures thereof.

Further preferably, the at least one solvent-containing, preferably flowable, polyurethane-containing composition used to produce the at least one protective layer has at least one organic solvent, for example ethyl acetate, 2-butanone, acetone, toluene, xylenes or mixtures thereof.

Further preferably, an at least one solvent-containing, preferably flowable, polyurethane-containing composition, which comprises above-named isocyanate prepolymers and is used to produce the at least one protective layer, is anhydrous. Above-named capped isocyanate prepolymers can, by contrast, be present as an aqueous dispersion.

Further preferably, an at least one solvent-containing, preferably flowable, polyurethane-containing composition, which comprises above-named prepolymers with free groups reactive to isocyanate groups, which can be crosslinked or uncrosslinked, above-named prepolymers with capped groups reactive to isocyanate groups, which can be crosslinked or uncrosslinked, or mixtures thereof and is used to produce the at least one protective layer, has water and/or at least one organic solvent, for example ethyl acetate, 2-butanone, acetone, toluene, xylenes or mixtures thereof.

After the, preferably complete, removal of the carrier ply in step b) of the method according to the invention, the application of at least one protective layer to the at least one upper layer not yet completely cured at least in areas is effected, preferably directly, in step c) by at least partial flooding and/or dousing of the at least one upper layer with at least one solvent-containing, preferably flowable, polyurethane-containing composition and subsequent curing, preferably at a temperature from a range of from 25° C. to 180° C.

When 2C PUR systems are used, the polyurethane precursors, for example polyol-containing and isocyanate-containing component, are preferably stored separately and only combined when required in the mixing head. The heat of reaction generated during the reaction of the polyurethane precursors preferably results in a heating to a temperature of from 60° C. to 180° C., preferably from 80° C. to 120° C.

The surfaces or walls of the molds used can also preferably have a temperature from a range of from 40° C. to 160° C., preferably from a range of from 80° C. to 120° C.

Preferably, the application of the at least one protective layer to the at least one upper layer in step c) is effected by open flooding, flooding in a casting die or flooding in a 2C die.

In the case of open flooding, the surface tension of the at least one solvent-containing, preferably flowable, polyurethane-containing composition used to produce the at least one protective layer is preferably utilized in the outer edge area of the component to be flooded, wherein the protective layer is flooded onto the component without a mold giving the die outline. The curing is preferably effected through appropriate storage, preferably for a period of from 2 s to 60 s, of the flooded component at a temperature from a range of from 20° C. to 100° C.

In the case of flooding in a casting die, the entire process takes place in a closed die, which predefines the area to be flooded as a cavity.

The at least one solvent-containing, preferably flowable, polyurethane-containing composition used to produce the at least one protective layer is preferably poured in via a mixing head, preferably at a pressure of less than 10 bar.

A first curing phase can be triggered by exposing the mold to heat, for example at a temperature of from 60° C. to 160° C., preferably for a time interval of from 60 s to 600 s.

After the removal of the casting die, for a residual curing the component is preferably stored for a further approx. 24 h before further use.

In the case of flooding in a 2C die, the flooding is effected in combination with an injection-molding process, wherein the at least partial coverage of at least one surface of the transfer ply of the transfer film facing away from the carrier ply with at least one plastic injection-molding composition which comprises a thermoplastic, a thermosetting plastic or a mixture thereof is preferably effected in a first area of the 2C die.

In a second area of the 2C die, the at least partial flooding and/or dousing of the at least one upper layer with at least one solvent-containing, preferably flowable, polyurethane-containing composition is effected by a PUR mixing head.

The 2C die preferably has a rotating mechanism or a shifting plate, which is brought into the respective position.

During the curing, preferably complete curing, of the at least one upper layer of the transfer ply not yet completely cured at least in areas and of the protective layer applied thereto, for example free isocyanate groups which are contained in the upper layer of the transfer ply can react with free groups, reactive to isocyanate groups, of the solvent-containing, preferably flowable, polyurethane-containing composition used to produce the at least one protective layer.

A layer is preferably referred to as "cured" within the meaning of the present invention if more than 95% of the polymer constituents which are capable of a crosslinking, preferably binders, for example free isocyanate groups and/or free groups reactive to isocyanate groups, of the respective layer have a crosslinking.

Before and/or during and/or after the application of the at least one protective layer in step c), the at least one protective layer can preferably be modified and/or structured, preferably by placing particles in/on the at least one upper layer of the transfer ply after step b) and/or through the use of die structures during the application in step c) and/or through subsequent lasering, overprinting, machining and/or overstamping of the at least one protective layer.

Preferably, a modification of the protective layer and of the at least one upper layer of the transfer ply can take place in register with design features and/or motifs already present in the transfer ply, for example a surface structure in register with a wood grain or a structure which can be perceived by touch in register with a motif.

An at least one protective layer produced by the method according to the invention preferably has transparent or to a reduced extent light-transmitting properties.

By "transparent" is preferably meant a transmission in the visible wavelength range of more than 50%, preferably of more than 80%, and further preferably of more than 90%, of the corresponding part of the electromagnetic spectrum.

A film-coated article according to the invention, preferably produced by a method according to one of claims 12 to 17 further preferably using a transfer film according to one of claims 1 to 11, comprises a substrate and at least one transfer ply, which contains at least one decorative element, at least partially arranged on at least one surface of the substrate, wherein the side of the transfer ply facing away from the substrate is formed by at least one, preferably cured, upper layer, on which at least one protective layer, which comprises at least one plastic based on a polyurethane, with a thickness from a range of from 0.2 mm to 5 mm is arranged, wherein the at least one protective layer adheres to the at least one, preferably cured, upper layer with an adhesiveness, determined according to the method described in DIN EN ISO 4624: 2016-08, preferably with a PosiTest® AT Series pull-off adhesion tester from DeFelsko Corporation (Ogdensburg, N.Y., USA) using a 20 mm dolly, from a range of from 2.5 MPa to 5 MPa, in particular from 2.5 MPa to 10 MPa.

Preferably, the substrate is selected from the group which consists of paper, plastic, wood, composite, in particular woven or non-woven fiber composite materials or also laminates, glass, metal and combinations thereof.

BRIEF DESCRIPTION OF THE DRAWINGS

In the following the invention is explained with reference to several embodiment examples utilizing the attached drawings by way of example. There are shown in.

DETAILED DESCRIPTION OF THE PREFERRED EMBODIMENTS

The abbreviation "wt.-%" used in the present patent application denotes the specification of content "percent by weight".

A transfer film 1 according to the invention comprises a carrier ply 10, 10' and a transfer ply 13, 13', 13", which contains at least one decorative element, arranged on the carrier ply 10, 10', wherein the transfer ply 13, 13', 13", adjoining the carrier ply 10, 10', has at least one upper layer 15, which is not yet completely cured at least in areas, wherein the at least one decorative element is arranged on the side of the at least one upper layer 15 facing away from the carrier ply 10, 10', and wherein the carrier ply 10, 10' is at least one carrier layer 11 made of a polyester, a polyolefin or a combination thereof, in particular made of PET, preferably with a layer thickness of from 10 µm to 75 µm, further preferably from 20 µm to 40 µm.

Preferably, the at least one upper layer 15 not yet completely cured at least in areas has a thickness of from 0.5 µm to 15 µm, preferably from 1 µm to 12 µm.

Preferably, the at least one decorative element is arranged in at least one decorative layer 14, which comprises, in each case independently of one another, a UV-crosslinked varnish or a thermoplastically deformable layer and which is, in each case independently of one another, unpigmented or pigmented or dyed.

Further preferably, the layer thickness of the at least one decorative layer 14 is, in each case independently of one another, from 0.1 µm to 15 µm, further preferably from 4 to 8 µm.

Figure 1:
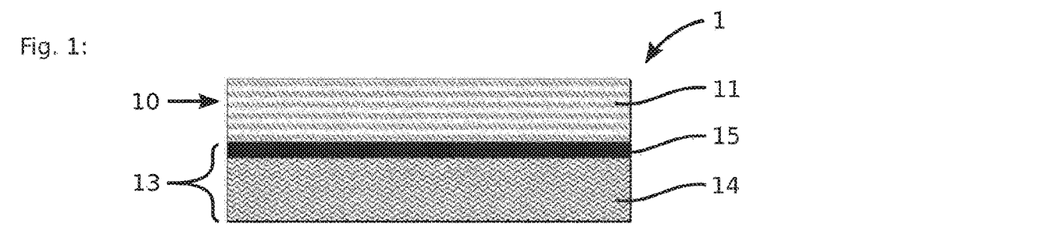
FIG. 1 shows a schematic representation of a transfer film

In the preferred embodiment of a transfer film 1 according to the invention represented in FIG. 1, the at least one decorative element is arranged in at least one decorative layer 14. The at least one decorative layer 14 is arranged on the side of the at least one upper layer 15 of the transfer ply 13 facing away from the carrier ply 10, 10'.

The at least one decorative layer 14 can comprise one or more layers which are arranged over the whole surface or partially in the one transfer ply 13, 13', 13" and which are preferably selected from: transparent and/or colored varnish layer, in particular comprising one or more dyes and/or pigments, replication layer with a molded optically active surface structure, reflective layer, in particular opaque reflective layer, transparent reflective layer, metallic reflective layer or dielectric reflective layer, optically variable layer, adhesion-promoter layer, adhesive layer, hot-melt adhesive layer, heat-sealing adhesive layer, cold adhesive layer, interference multilayer system, volume hologram layer, liquid crystal layer, in particular cholesteric liquid crystal layer, electrically conductive layer, antenna layer, electrode layer, magnetic layer, magnetic storage layer, barrier layer, and/or combinations of two or more of the above layers.

For example, at least one varnish layer 16 with a layer thickness of from preferably 0.5 µm to 10 µm, further preferably from 1 µm to 5 µm, can be arranged on the surface of the transfer ply 13, 13', 13" facing away from the carrier ply 10, 10'.

Figure 2:
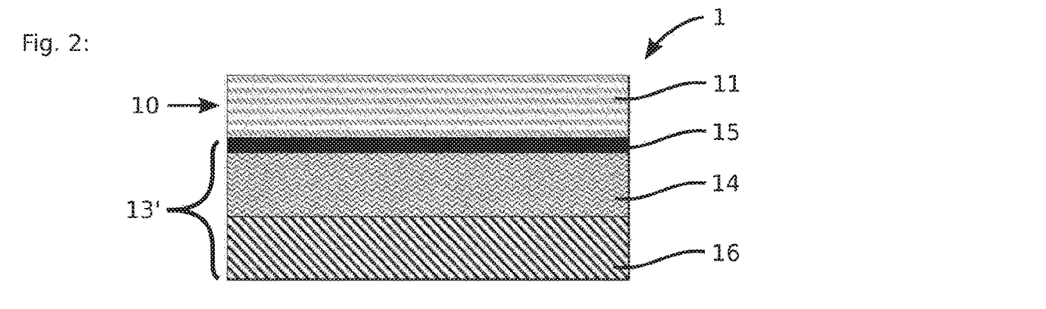
FIG. 2 shows a schematic representation of a transfer film

In the preferred embodiment of a transfer film 1 according to the invention represented in FIG. 2, at least one varnish layer 16 is arranged on the surface of the transfer ply 13' facing away from the carrier ply 10.

In the preferred embodiment represented in FIG. 2, the at least one decorative layer 14 is arranged between the at least one upper layer 15 of the transfer ply 13' and the at least one varnish layer 16.

Preferably, the at least one varnish layer 16 comprises or consists of at least one adhesive which is selected from the group which consists of physically curing adhesives, chemically curing adhesives, pressure-sensitive adhesives or mixture thereof.

Preferably, a first adhesion-promoter layer 17, which preferably has a layer thickness of from 0.1 µm to 10 µm, further preferably from 1 µm to 4 µm, can be arranged between the at least one upper layer 15 not yet completely cured at least in areas and the at least one decorative layer 14.

Preferably, the first adhesion-promoter layer 17 comprises or consists of at least one acrylic resin.

Figure 3:
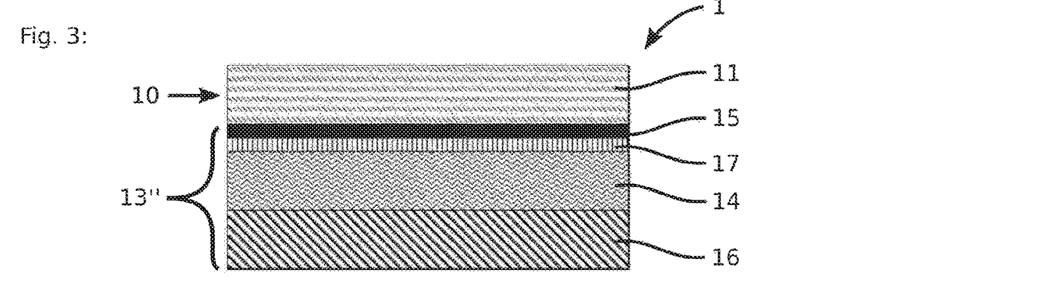
FIG. 3 shows a schematic representation of a transfer film

In the preferred embodiment of a transfer film 1 according to the invention represented in FIG. 3, a first adhesion-promoter layer 17 is arranged between the at least one upper layer 15 not yet completely cured at least in areas and the at least one decorative layer 14, wherein furthermore at least one varnish layer 16 can be arranged on the surface of the transfer ply 13" facing away from the carrier ply 10.

Preferably, the transfer film 1 can have at least one detachment layer 12, preferably with a layer thickness of from 0.1 nm to 50 nm, further preferably from 1 nm to 20 nm, which is arranged between the carrier layer 11 and the at least one upper layer (15).

Further preferably, the at least one detachment layer 12 comprises or consists of at least one wax.

Figure 4:
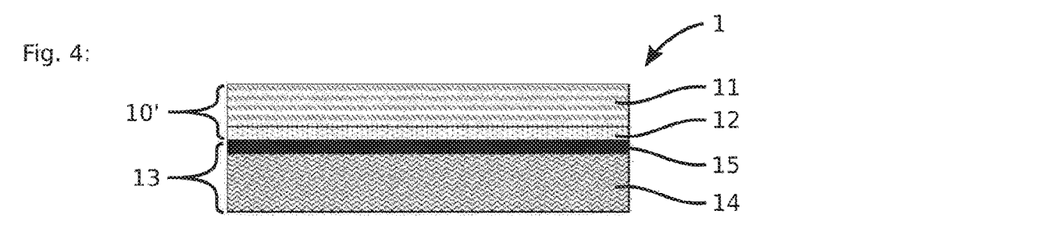
FIG. 4 shows a schematic representation of a transfer film

In the preferred embodiment of a transfer film 1 according to the invention represented in FIG. 4, the carrier ply 10' is formed by at least one carrier layer 11 and at least one detachment layer 12 arranged thereon. The transfer ply 13 arranged on the carrier ply 10' is preferably formed by at least one upper layer 15 arranged on the detachment layer 12 and at least one decorative layer 14 arranged thereon.

Preferably, the carrier ply 10, 10' is arranged on the at least one upper layer 15 with an adhesiveness, preferably determined with a Z006 measuring instrument from Zwick, from a range of from 2 cN to 50 cN, preferably from a range of from 5 cN to 35 cN.

During the measurement of the adhesiveness of the carrier ply 10, 10' to the at least one upper layer 15 with a Z006 measuring instrument from Zwick, in a first step a coated test piece is preferably produced by strongly adhesive application of a transfer film in a width of 3.5 cm to a plastic plate by means of hot stamping.

During the measurement, in a second step the carrier ply is preferably peeled off the test piece vertically over a length of 100 mm. The required forces in the area of the length of from 10 mm to 90 mm of the applied carrier film are preferably measured with a Z006 measuring instrument from Zwick GmbH & Co. KG (Ulm, Del.).

To measure the adhesiveness, the above-named Z006 measuring instrument is preferably combined with a horizontal substrate receiver. The substrate receiver has a movable slide, to which a test substrate is attached. The transfer film 1 is applied to the test substrate, in particular by means of hot stamping. The carrier ply 10, 10' of the applied transfer film 1 is preferably deflected from the horizontal into the vertical by means of a deflection roller and attached to the above-named measuring instrument. During the measurement and of the force of the measuring instrument acting vertically as uniformly as possible on the carrier ply 10, 10', the slide with the test substrate is moved or pulled correspondingly such that it is possible to peel the carrier ply 10, 10' off the transfer ply 13, 13', 13" applied to the test substrate.

A film-coated article 2 according to the invention, produced by a method according to one of claims 12 to 17 using a transfer film 1 according to one of claims 1 to 11, comprises a substrate S and at least one transfer ply 13, 13', 13", which contains at least one decorative element, at least partially arranged on at least one surface of the substrate S, wherein the side of the transfer ply 13, 13', 13" facing away from the substrate S is formed by at least one, preferably cured, upper layer 15, on which at least one protective layer 20, which comprises at least one plastic based on a polyurethane, with a thickness from a range of from 0.2 mm to 5 mm is arranged, wherein the at least one protective layer 20 adheres to the at least one upper layer 15 with an adhesiveness, determined according to the method described in DIN EN ISO 4624: 2016-08, preferably with a PosiTest® AT Series pull-off adhesion tester from DeFelsko Corporation (Ogdensburg, N.Y., USA) using a 20 mm dolly, from a range of from 2.5 MPa to 5 MPa, in particular from 2.5 MPa to 10 MPa.

The adhesiveness can be determined according to the methods described in DIN EN ISO 4624: 2016-08 ("Beschichtungsstoffe—Abreißversuch zur Bestimmung der Haftfestigkeit", issue date: 2016-08 ["Paints and varnishes—Pull-off test for adhesion"]) and DIN EN ISO 16276-1: 2007-08 ("Korrosionsschutz von Stahlbauten durch Beschichtungssysteme—Beurteilung der Adhasion/Kohasion (Haftfestigkeit) einer Beschichtung und Kriterien für deren Annahme—Teil 1: AbreiBversuch", issue date: 2007-08 ["Corrosion protection of steel structures by protective paint systems—Assessment of, and acceptance criteria for, the adhesion/cohesion (fracture strength) of a coating—Part 1: Pull-off testing"]), for example through the use of a PosiTest® AT adhesion tester from DeFelsko Corporation (Ogdensburg, N.Y., USA), which, by means of hydraulic pressure, preferably measures the force which is required to detach a specified test area of a coating from the substrate.

Preferably, the substrate S is selected from the group which consists of paper, plastic, wood, composite, glass, metal and combinations thereof.

Figure 5:
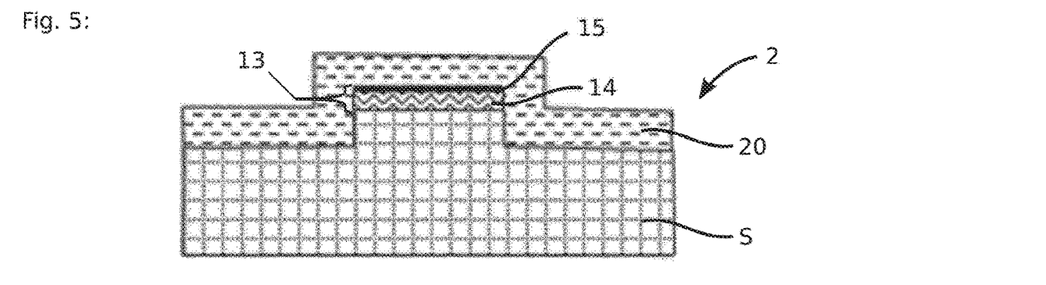
FIG. 5 shows a schematic representation of a film-coated item.

In the preferred embodiment of a film-coated article 2 according to the invention represented in FIG. 5, the transfer ply 13 has a cured upper layer 15 and at least one decorative layer 14, which is partially arranged on at least one surface of the substrate S, wherein the side of the transfer ply 13 facing away from the substrate S is formed by at least one, preferably cured, upper layer 15, on which at least one protective layer 20, which comprises at least one plastic based on a polyurethane, with a thickness from a range of from 0.2 mm to 5 mm is arranged.

The protective layer 20 is furthermore likewise arranged on the substrate S.

The transfer ply 13 has been joined to a plastic-containing substrate S by partial hot stamping of a transfer film 1 represented in FIG. 1 or FIG. 4, wherein, after the joining, the respective carrier ply 10 or 10' has been removed from the transfer ply 13 arranged on the substrate S.

The application of the at least one protective layer 20 to the at least one upper layer 15 of the transfer ply 13 is then effected by flooding and/or dousing of the at least one upper layer 15 of the transfer ply 13 with at least one solvent-containing, preferably flowable, polyurethane-containing composition and subsequent curing, preferably at a temperature from a range of from 60° C. to 160° C.

Figure 6:
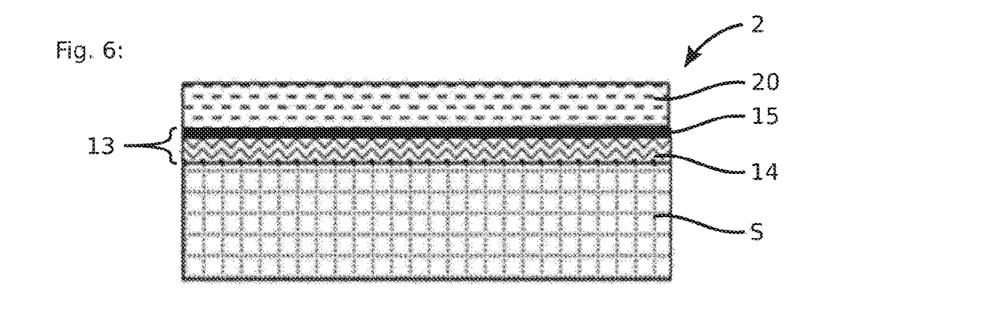
FIG. 6 shows a schematic representation of a film-coated item.

In the preferred embodiment of a film-coated article 2 according to the invention represented in FIG. 6, the transfer ply 13 has a cured upper layer 15 and at least one decorative layer 14, which is arranged on at least one surface of the substrate S over the whole surface, wherein the side of the transfer ply 13 facing away from the substrate S is formed by at least one, preferably cured, upper layer 15, on which at least one protective layer 20, which comprises at least one plastic based on a polyurethane, with a thickness from a range of from 0.2 mm to 5 mm is arranged.

The protective layer 20 is arranged only on transfer ply 13.

The transfer ply 13 has been joined to a plastic-containing substrate S by hot stamping over the whole surface of a transfer film 1 represented in FIG. 1 or FIG. 4, wherein, after the joining, the respective carrier ply 10 or 10' has been removed from the transfer ply 13 arranged on the substrate S.

The application of the at least one protective layer 20 to the at least one upper layer 15 of the transfer ply 13 is then effected by flooding and/or dousing of the at least one upper layer 15 of the transfer ply 13 with at least one solvent-containing, preferably flowable, polyurethane-containing composition and subsequent curing, preferably at a temperature from a range of from 60° C. to 160° C.

Figure 7:
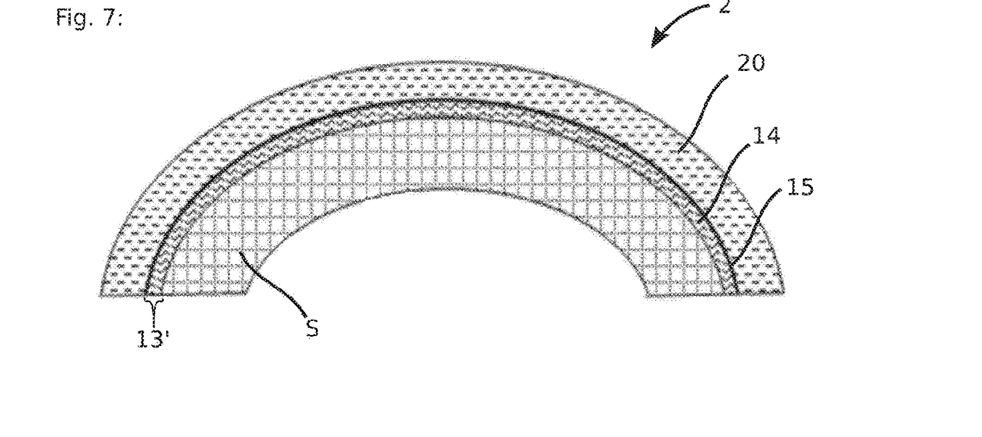
FIG. 7 shows a schematic representation of a film-coated item.

In the preferred embodiment of a film-coated article 2 according to the invention represented in FIG. 7, the transfer ply 13 has at least one cured upper layer 15 and at least one decorative layer 14, which is arranged on at least one surface of the substrate S over the whole surface, wherein the side of the transfer ply 13 facing away from the substrate S is formed by at least one, preferably cured, upper layer 15, on which at least one protective layer 20, which comprises at least one plastic based on a polyurethane, with a thickness from a range of from 0.2 mm to 5 mm is arranged.

The upper layer 15 has a thickness of from 0.5 μm to 15 μm, preferably from 1 μm to 12 μm.

The joining of the substrate S to at least one surface of the transfer ply 13 of the transfer film facing away from the carrier ply was effected by covering the whole surface, formed by decorative layer 14, of the transfer ply 13 of the transfer film 1 represented in FIG. 1 or FIG. 4 with at least one plastic injection-molding composition, which comprises a thermoplastic, a thermosetting plastic or a mixture thereof.

After the joining, the respective carrier ply 10 or 10' has been removed from the transfer ply 13 arranged on the substrate S.

The application of the at least one protective layer 20 to the at least one upper layer 15 of the transfer ply 13 is then effected by flooding and/or dousing of the at least one upper layer 15 of the transfer ply 13 with at least one solvent-containing, preferably flowable, polyurethane-containing composition and subsequent curing, preferably at a temperature from a range of from 60° C. to 160° C.

Figure 8:
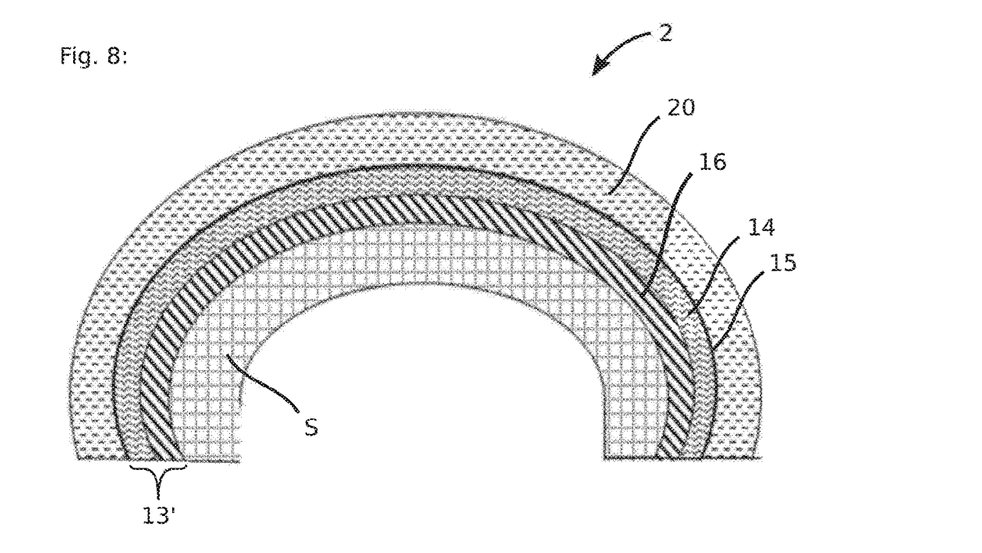
FIG. 8 shows a schematic representation of a film-coated item.

In the preferred embodiment of a film-coated article 2 according to the invention represented in FIG. 8, the transfer ply 13' has at least one cured upper layer 15, at least one decorative layer 14 and at least one varnish layer 16, which is arranged on at least one surface of the substrate S over the whole surface, wherein the side of the transfer ply 13 facing away from the substrate S is formed by at least one, preferably cured, upper layer 15, on which at least one protective layer 20, which comprises at least one plastic based on a polyurethane, with a thickness from a range of from 0.2 mm to 5 mm is arranged.

The upper layer 15 has a thickness of from 0.5 μm to 15 μm, preferably from 1 μm to 12 μm.

The joining of the substrate S to at least one surface of the transfer ply 13' of the transfer film 1 facing away from the carrier ply was effected by laminating the surface, formed by varnish layer 16, of the transfer ply 13' of the transfer film 1 represented in FIG. 2 onto at least one surface of a substrate S over the whole surface.

The application of the at least one protective layer 20 to the at least one upper layer 15 of the transfer ply 13' is then effected by flooding and/or dousing of the at least one upper layer 15 of the transfer ply 13' with at least one solvent-containing, preferably flowable, polyurethane-containing composition and subsequent curing, preferably at a temperature from a range of from 60° C. to 160° C.

The preferred embodiment of a film-coated article 2 according to the invention represented in FIG. 8 has an undercut.

With the method according to the invention, decorative undercuts can be coated in a simple manner with at least one decoration and subsequently in a simple manner with at least one protective layer.

To produce upper layer 15 of the transfer films 1 represented in FIG. 1 to FIG. 4 the following resin composition can be used, for example: 20 wt.-% to 90 wt.-% of at least one binder, for example polyurethane, 5 wt.-% to 25 wt.-% of at least one co-binder, for example acrylate copolymer, 1 wt.-% to 10 wt.-% of at least one of the above-named crosslinkers, 0 wt.-% to 10 wt.-% of at least one filler, for example aerosil, 0 wt.-% to 10 wt.-% of at least one of the above-named additives, 10 wt.-% to 50 wt.-% of at least one solvent, for example water, in each case relative to the total weight of the resin composition.

LIST OF REFERENCE NUMBERS

1 transfer film
2 film-coated article
S substrate
10, 10' carrier ply
11 carrier layer
12 detachment layer
13, 13', 13" transfer ply
14 decorative layer
15 upper layer
16 varnish layer
17 first adhesion-promoter layer
20 protective layer

The invention claimed is:

1. A method for producing a film-coated article using a transfer film, wherein the transfer film comprises a carrier ply and a transfer ply, which contains at least one decorative element, arranged on the carrier ply, wherein the method comprises the following steps:
    a) joining a substrate to at least one surface of the transfer ply facing away from the carrier ply, and
    b) removing the carrier ply from the transfer ply bonded to the substrate,
    c) applying at least one protective layer to a surface of the transfer ply lying opposite the substrate,
    wherein the transfer ply, adjoining the carrier ply, has at least one upper layer, which is not yet completely cured at least in areas, and which at least partially forms the surface of the transfer ply lying opposite the substrate, wherein the at least one decorative element is arranged on the side of the at least one upper layer of the transfer ply facing away from the carrier ply, and wherein the application of the at least one protective layer to the surface of the transfer ply in step c) is effected by at least partial flooding and/or dousing of the at least one upper layer with at least one composition comprising polyurethane precursors (2C PUR systems) and subsequent curing, and wherein the at least one protective layer adheres to the at least one upper layer of the transfer ply after the curing with an adhesiveness, determined according to the method described in DIN EN ISO 4624: 2016-08 from 2.5 MPa to 10 MPa, and wherein the composition comprising polyurethane precursors (2C PUR systems) is a flowable polyurethane-containing composition, which at a temperature of 25° C. has a dynamic viscosity from a range of from 2 mPa·s to 1500 mPa·s.

2. The method according to claim 1, wherein the application of the at least one protective layer to the at least one upper layer in step c) is effected by open flooding, flooding in a casting die or flooding in a 2C die.

3. The method according to claim 1, wherein before and/or during and/or after the application of the at least one protective layer in step c), the at least one protective layer is modified and/or structured.

4. The method according to claim 3, wherein the at least one protective layer is modified and/or stretched by placing particles in/on the at least one upper layer after step b) and/or through the use of die structures during the application in step c) and/or through subsequent lasering, overprinting and/or overstamping of the at least one protective layer.

5. The method according to claim 1, wherein, in step a), the joining of a substrate (S) to at least one surface of the transfer ply of the transfer film facing away from the carrier ply is effected by adhesive bonding, hot stamping, lamination or combinations thereof onto at least one surface of a substrate which is selected from the group which of paper, plastic, wood, composite, glass, metal and combinations thereof.

6. The method according to claim 1, wherein, in step a), during the joining of a substrate to at least one surface of the transfer ply of the transfer film facing away from the carrier ply, the surface of the transfer ply facing away is at least partially covered with at least one plastic injection-molding composition, wherein the transfer film is arranged in at least one injection mold and the at least one injection mold is filled with at least one plastic injection-molding composition, wherein the plastic injection-molding composition comprises a thermoplastic, a thermosetting plastic or a mixture thereof.

7. The method according to claim 1, wherein the subsequent curing is carried out at a temperature of from 25° C. to 180° C.

* * * * *